INVENTOR.
JESSE C. MOORE
BY William R Jacox
ATTORNEY

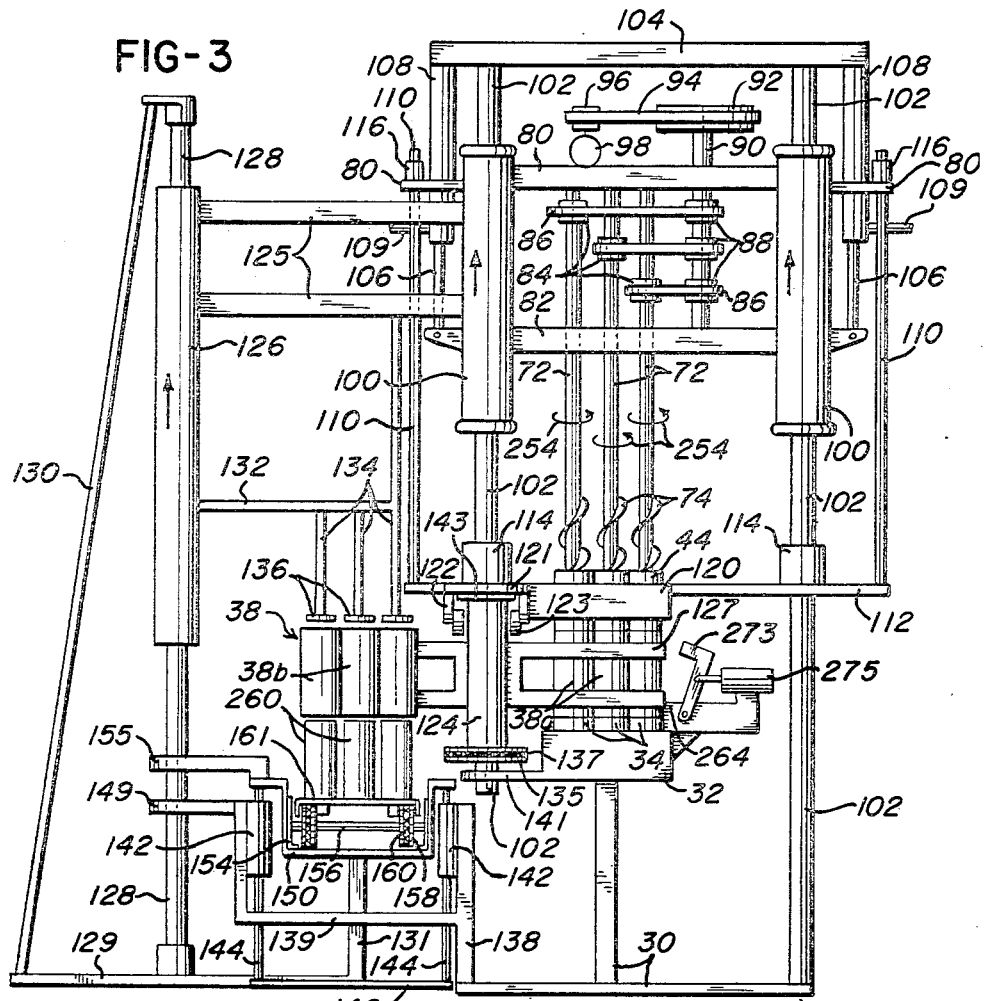
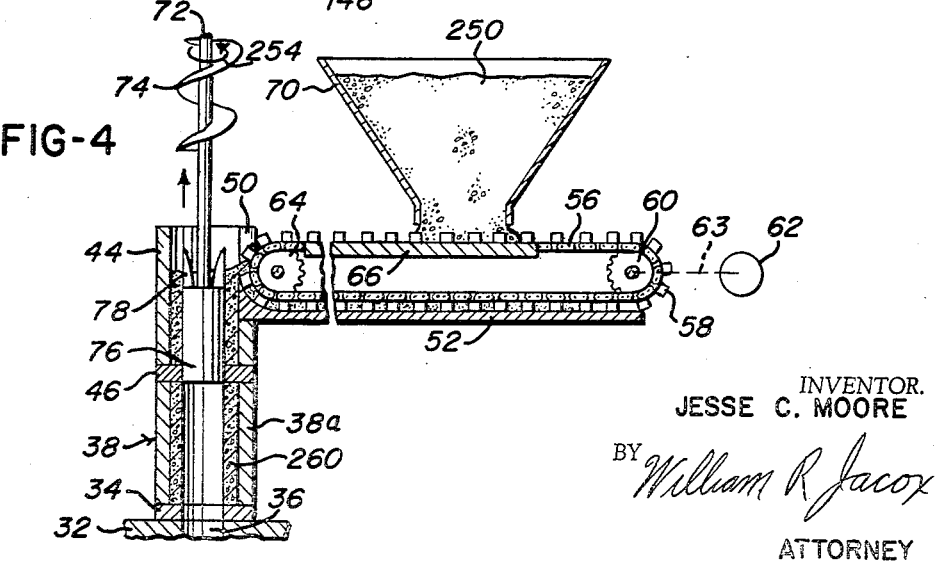

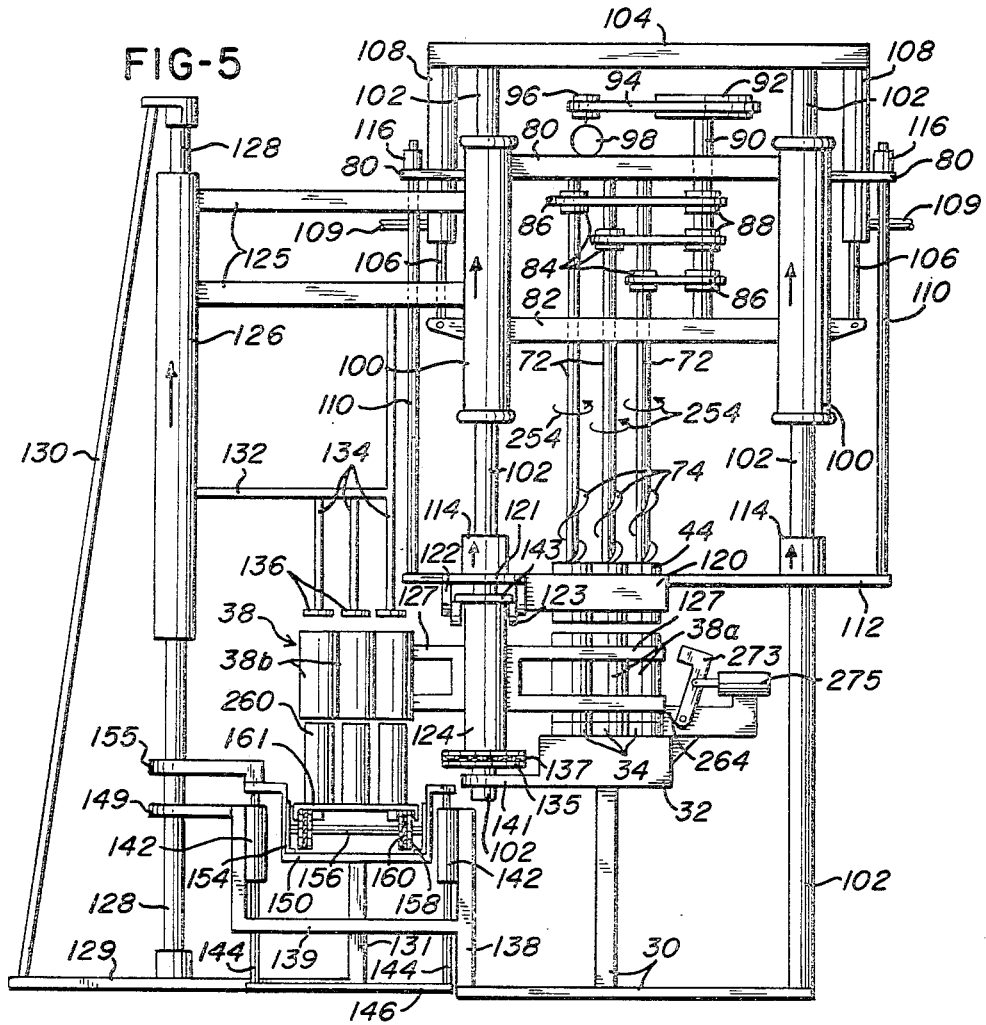
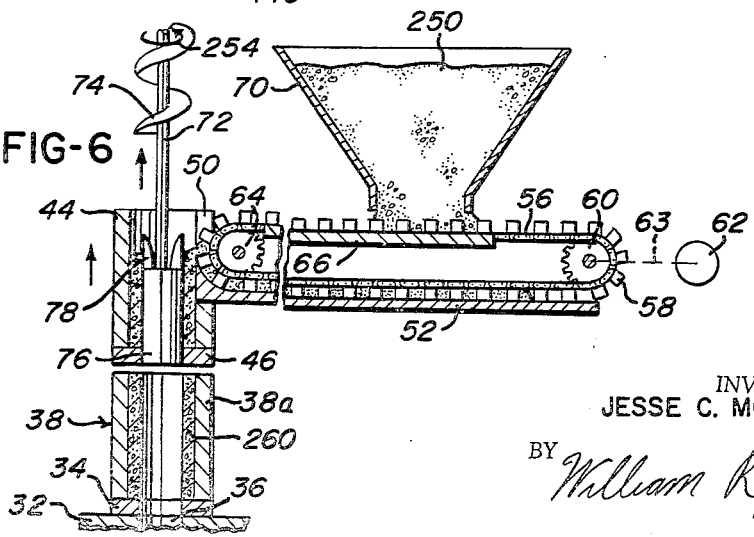

Dec. 16, 1969    J. C. MOORE    3,483,600
APPARATUS FOR FORMING MOLD MATERIAL
Filed Jan. 6, 1966    11 Sheets-Sheet 4
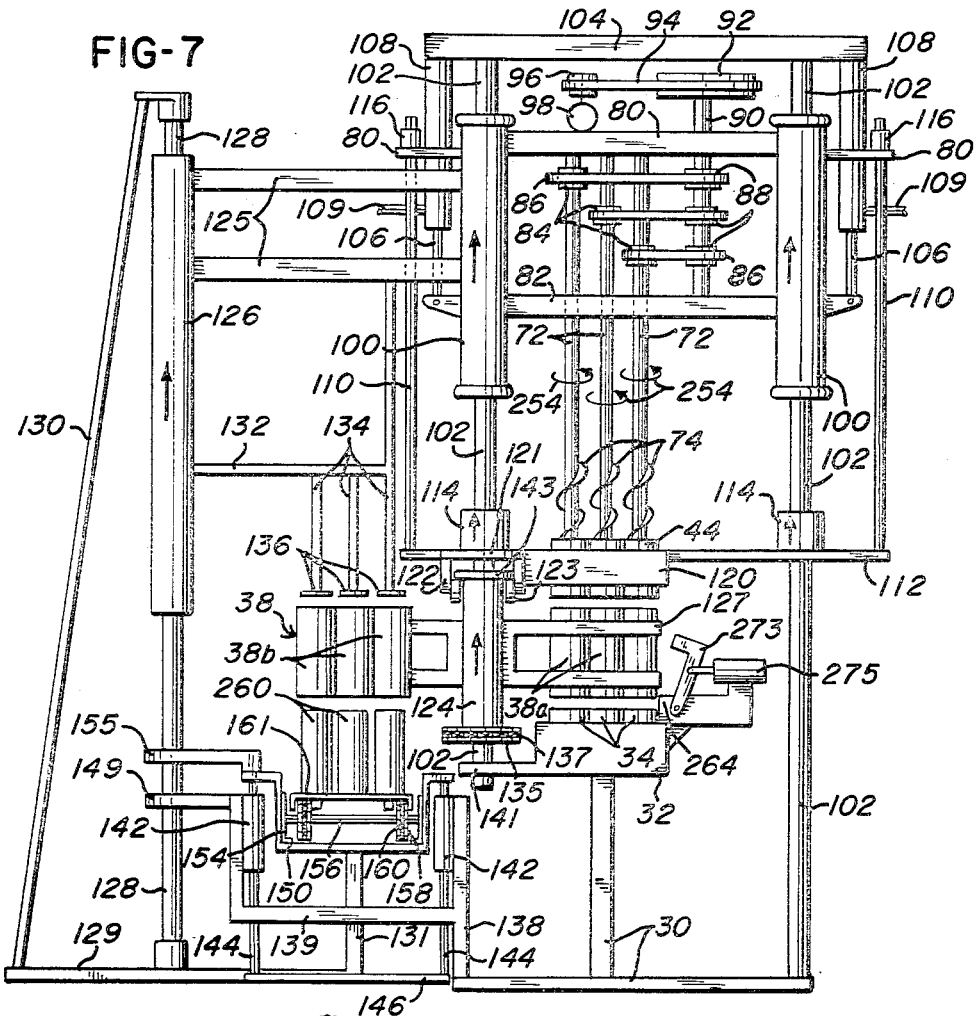
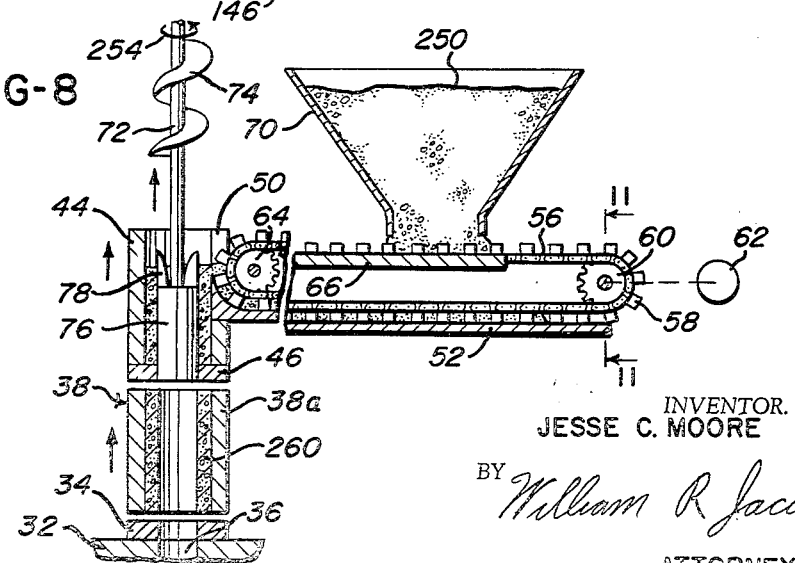
INVENTOR.
JESSE C. MOORE
BY William R Jacox
ATTORNEY Dec. 16, 1969     J. C. MOORE     3,483,600
APPARATUS FOR FORMING MOLD MATERIAL
Filed Jan. 6, 1966     11 Sheets-Sheet 5
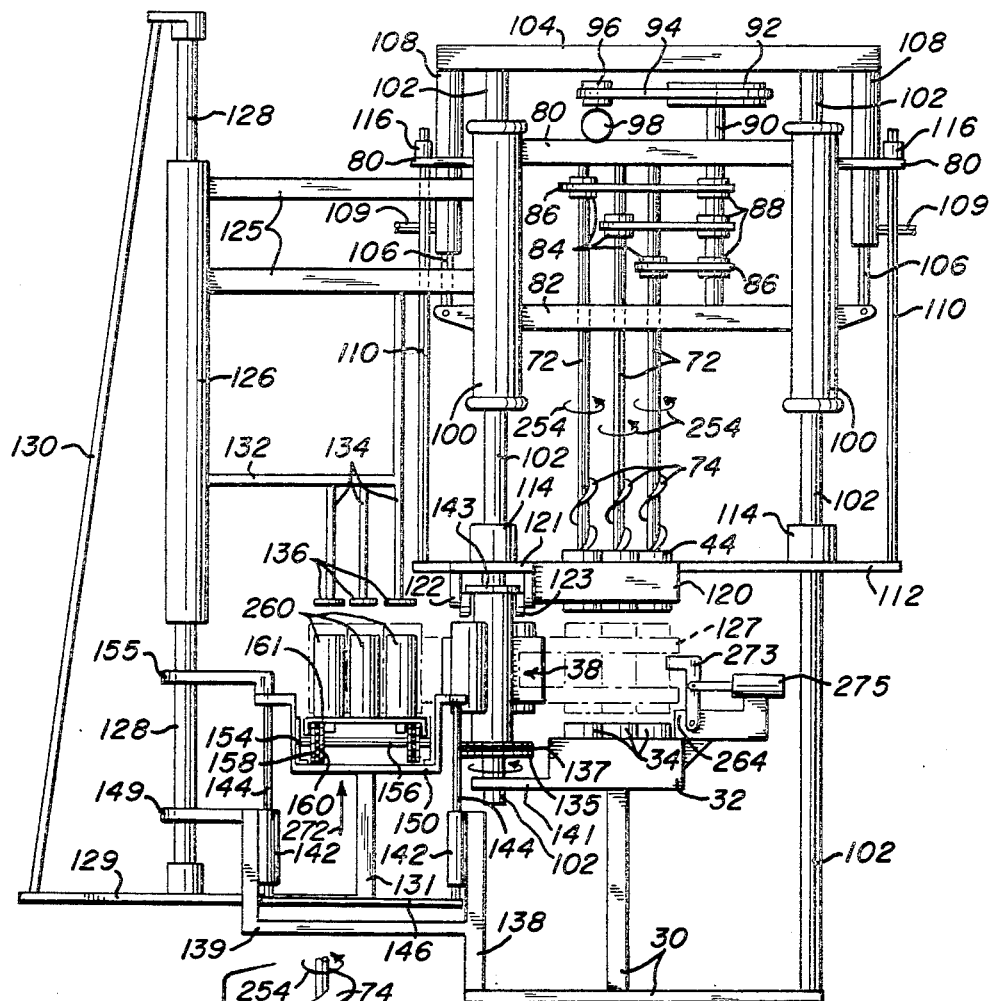
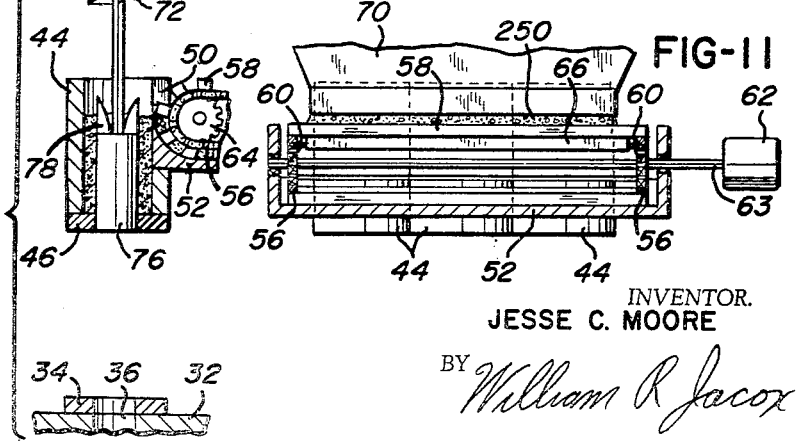
INVENTOR.
JESSE C. MOORE
BY *William R Jacox*
ATTORNEY

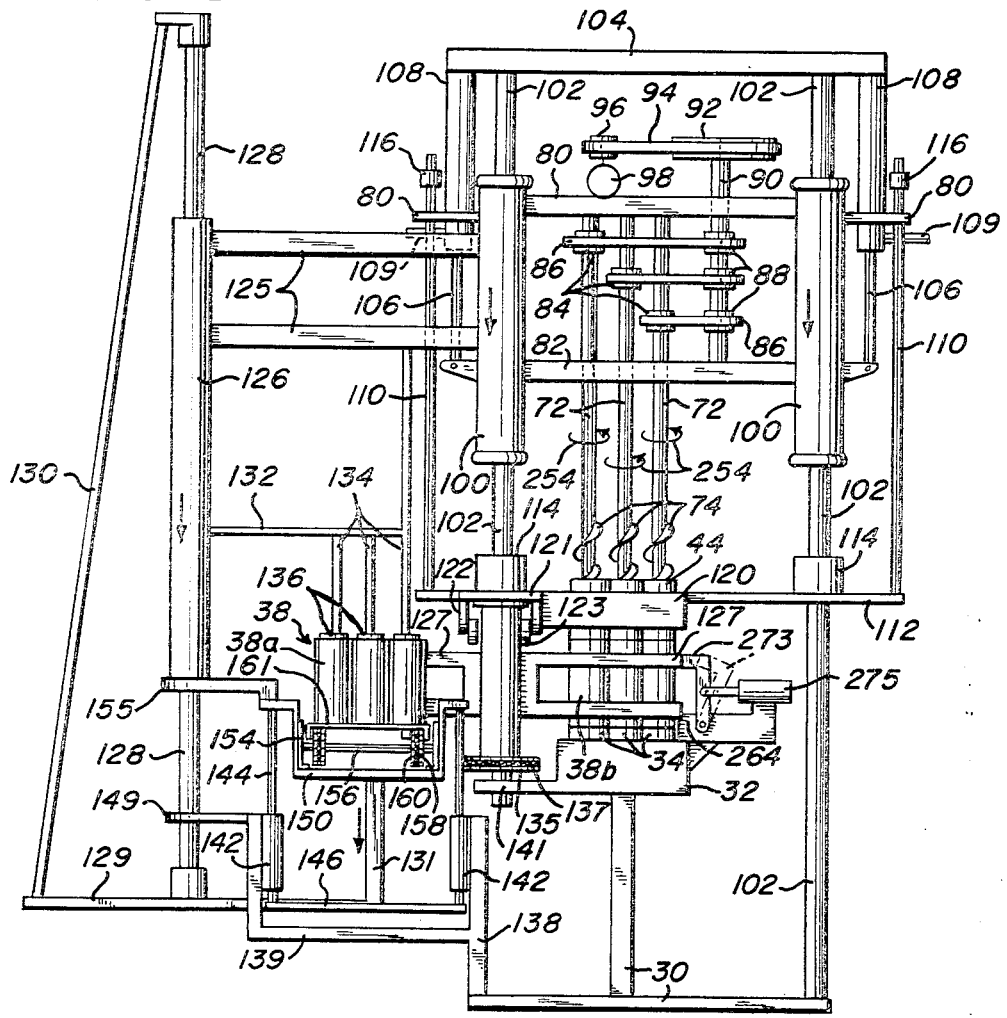
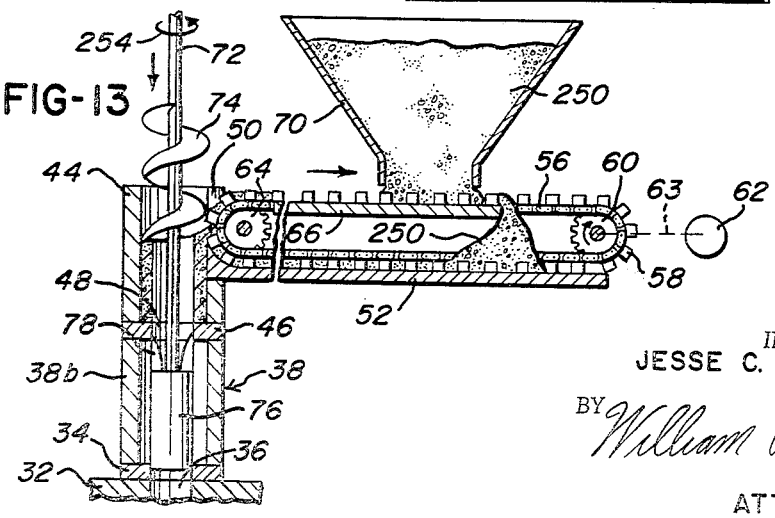

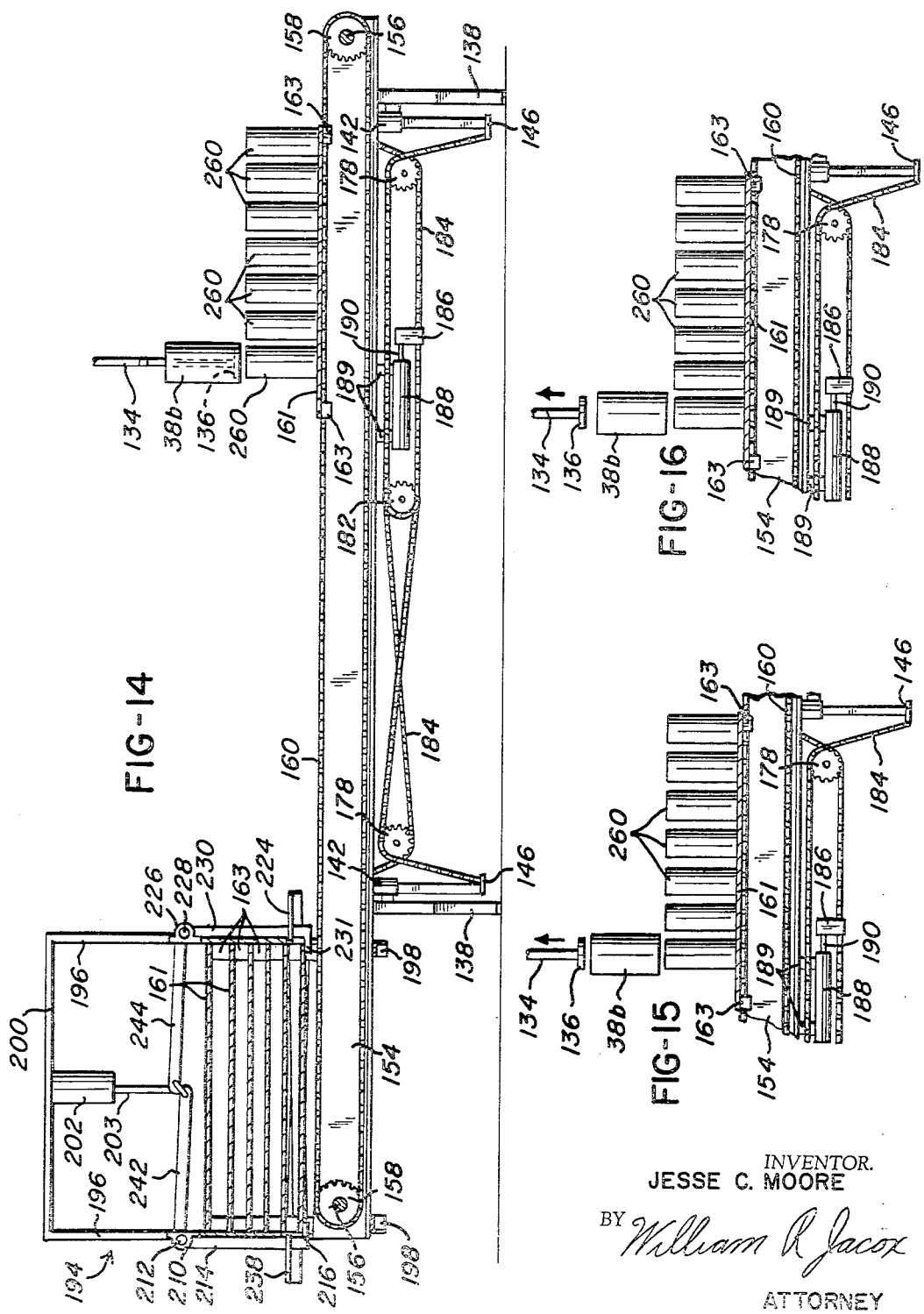

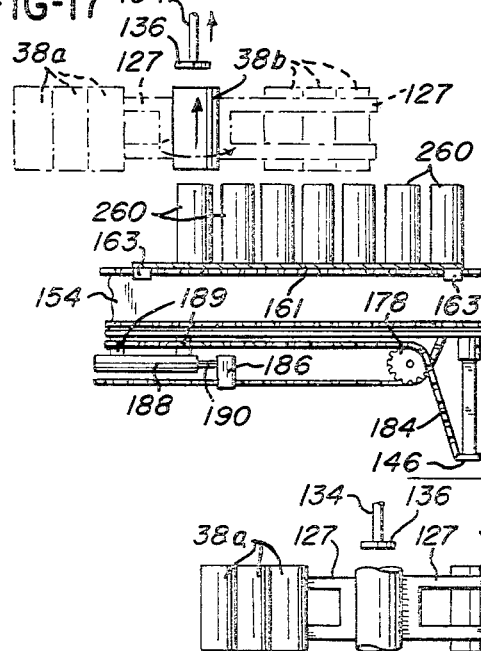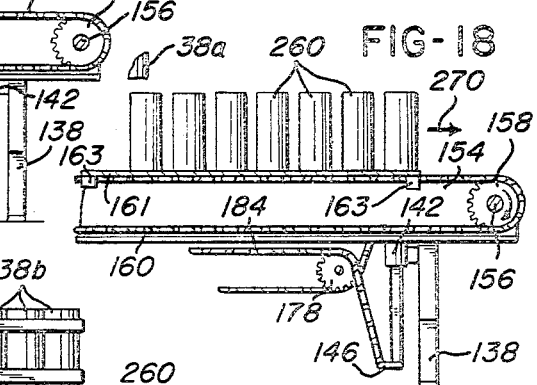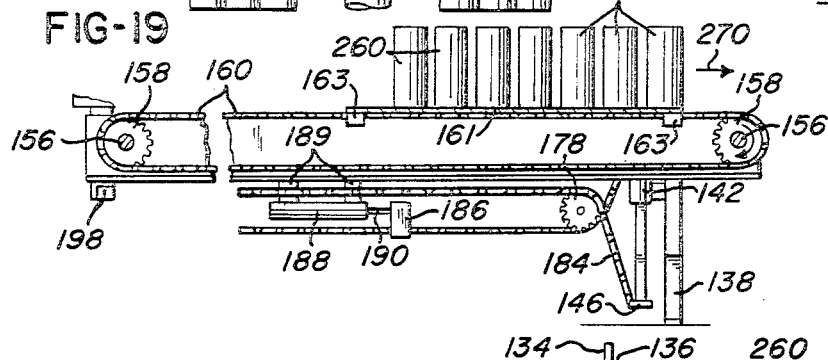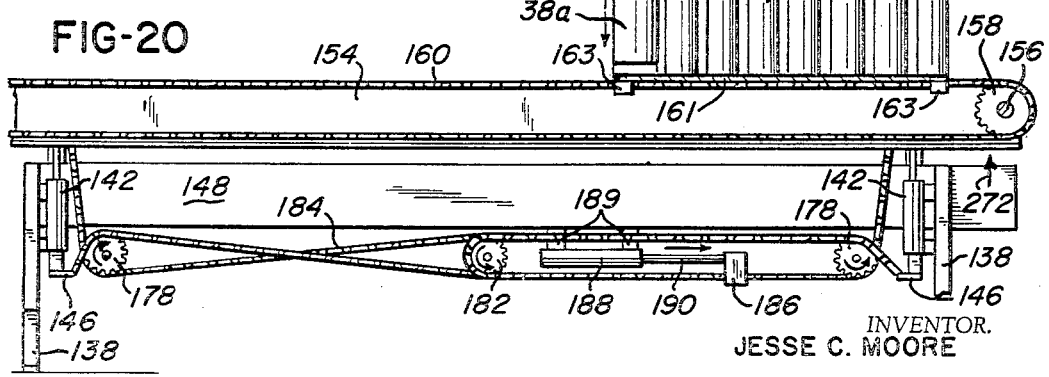

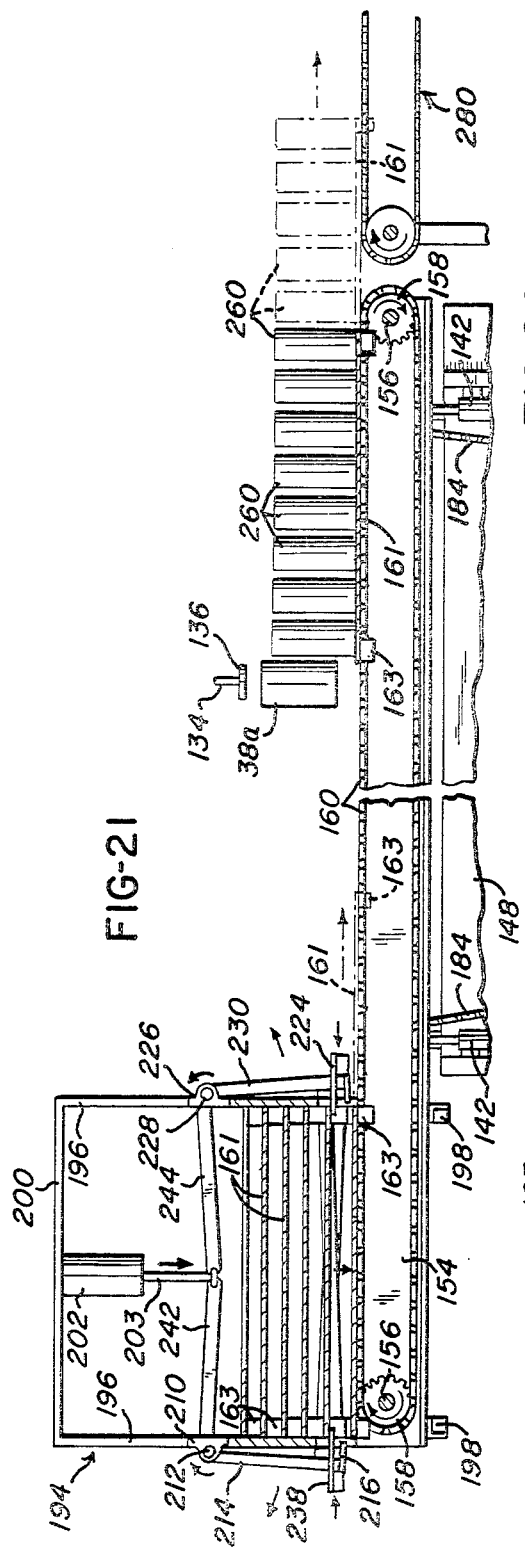
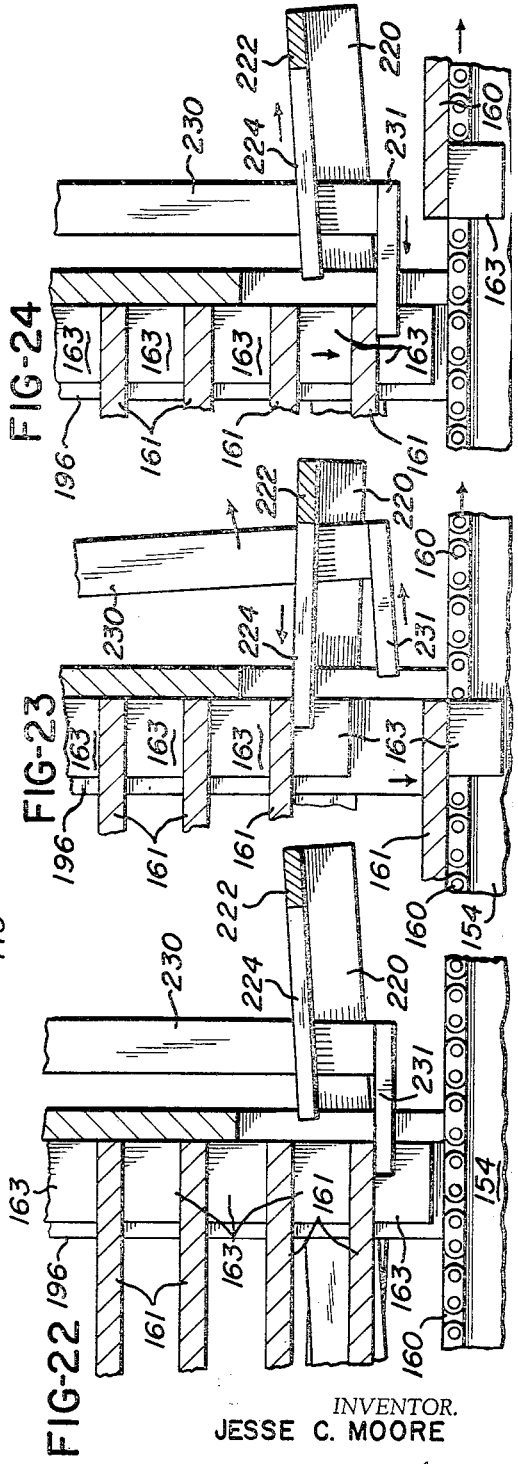

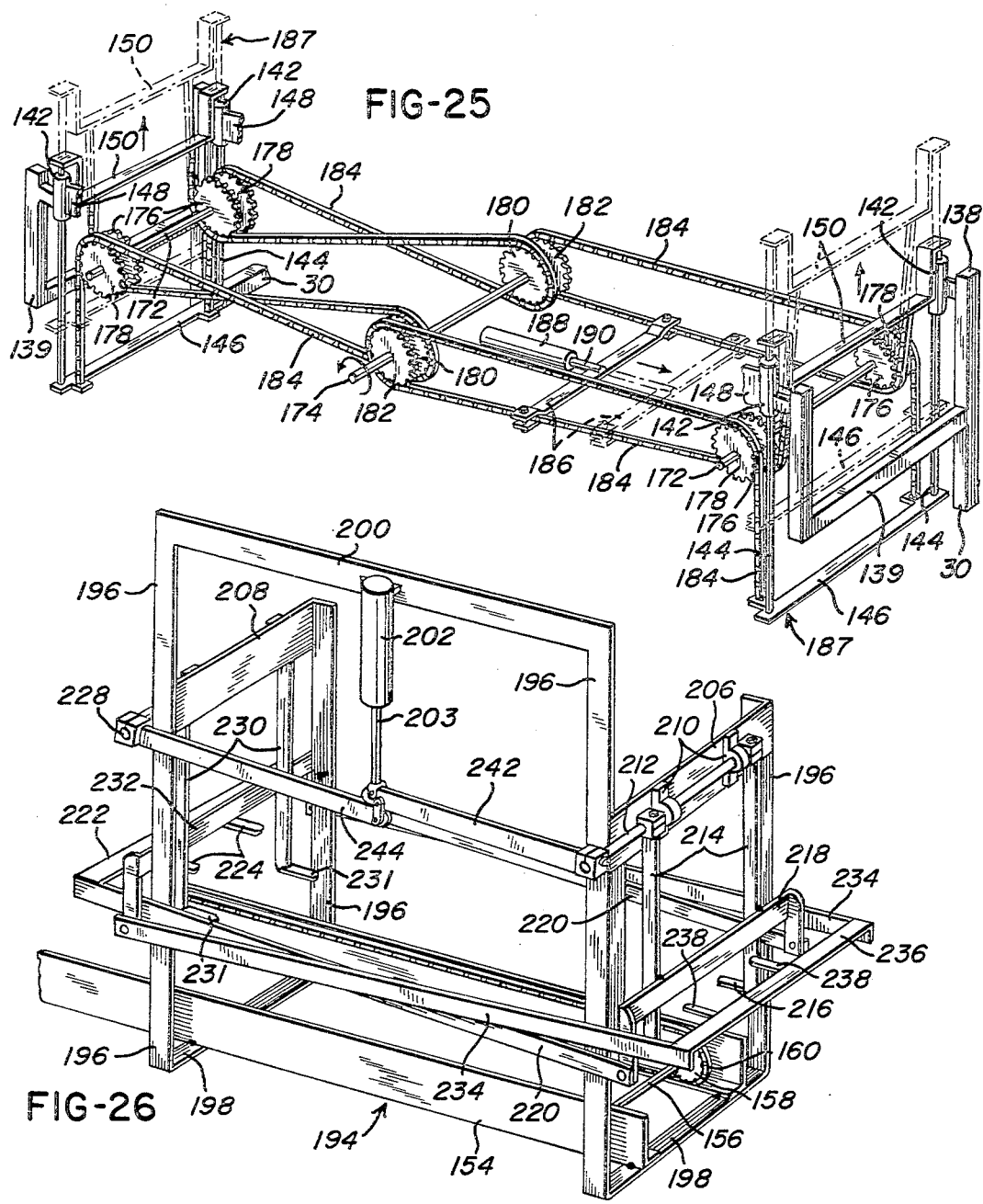

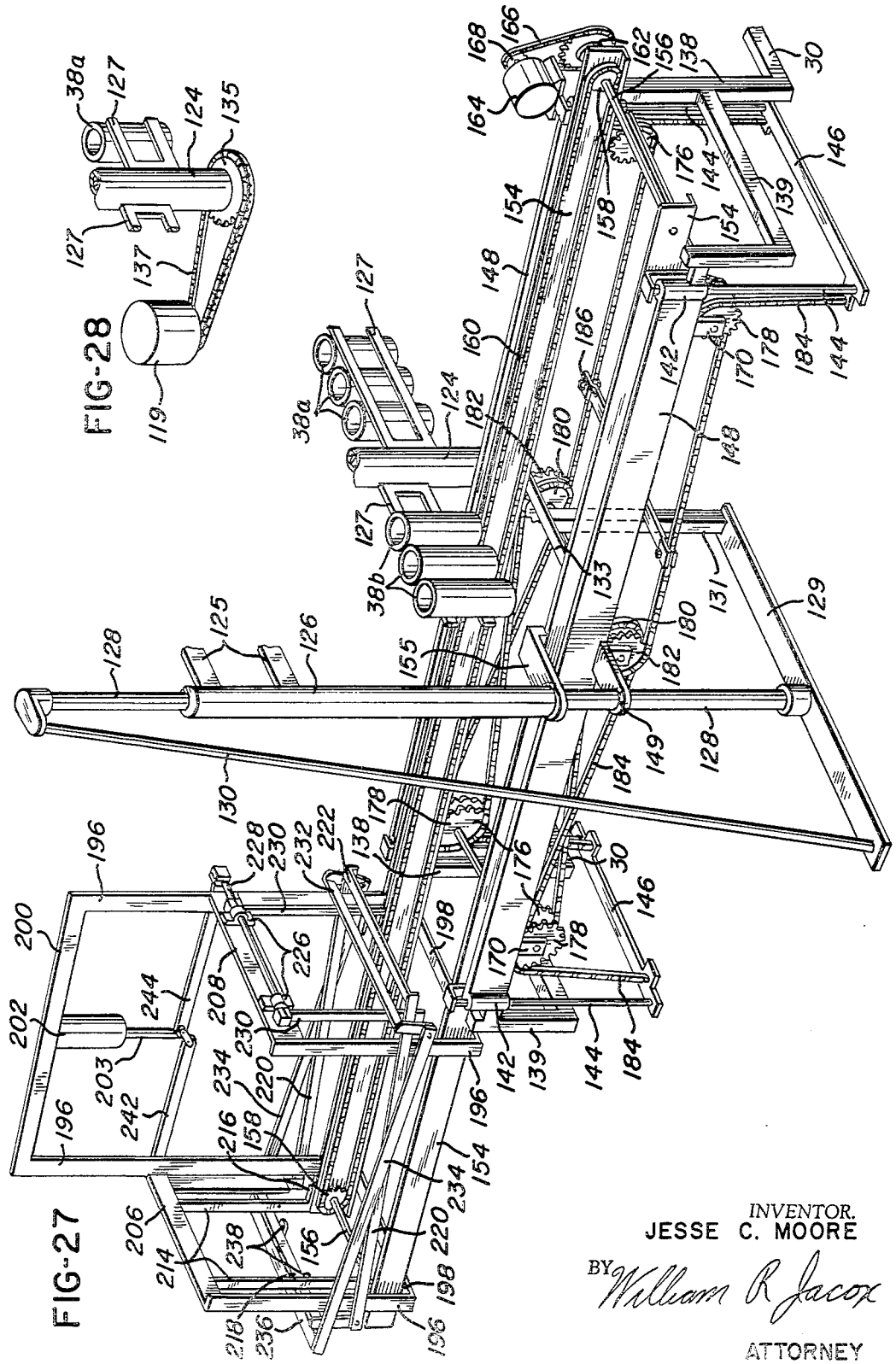

United States Patent Office 3,483,600
Patented Dec. 16, 1969

1

3,483,600
APPARATUS FOR FORMING MOLD MATERIAL
Jesse C. Moore, Fort Recovery, Ohio, assignor of forty-nine percent to Norman H. Kuhlman, St. Marys, Ohio
Filed Jan. 6, 1966, Ser. No. 519,179
Int. Cl. B28b 1/04
U.S. Cl. 25—30                4 Claims

ABSTRACT OF THE DISCLOSURE

Apparatus for automatic high speed seriatim production of bodies of molded material. Feeder means discharge mold material into one or more cavity members while packer means operate upon the mold material within the cavity members. Means are provided to move the cavity members to a discharge position after mold material has been formed therein. Ejector means operate to urge the molded material from the cavity members as other cavity members are receiving mold material and while the packer means are moving with respect to the cavity members which are receiving mold material. The molded material is discharged by the ejector means upon receiver means. The receiver means are moved to a position adjacent the mold cavity members as molded material begins to move from the mold cavity members. The receiver means and the ejector means then move together as molded material is moved by the ejector means from the mold cavity members. Items of the molded material are automatically arranged in closely spaced seriatim relationship upon the receiver means for movement from the apparatus.

BACKGROUND OF THE INVENTION

An object of this invention is to provide automatically operating apparatus for the production of tubular members such as tile or concrete members or the like.

Another object of this invention is to provide such apparatus which is capable of operation at a relatively high rate.

Other objects and advantages reside in the construction of the invention, combinations thereof, the method of manufacture, and the mode of operation, as will become more apparent from the following description.

IN THE DRAWINGS

FIGURE 3 is an elevational view, similar to FIGURE 1, but showing elements of the apparatus in another position of operation.

FIGURE 4 is a sectional view, similar to FIGURE 2, but showing elements of the apparatus in another position of operation.

FIGURE 5 is an elevational view, similar to FIGURES 1 and 3, but showing elements of the apparatus in another position of operation.

FIGURE 6 is a sectional view, similar to FIGURES 2 and 4, but showing elements of the apparatus in another position of operation.

2

Figure 1:
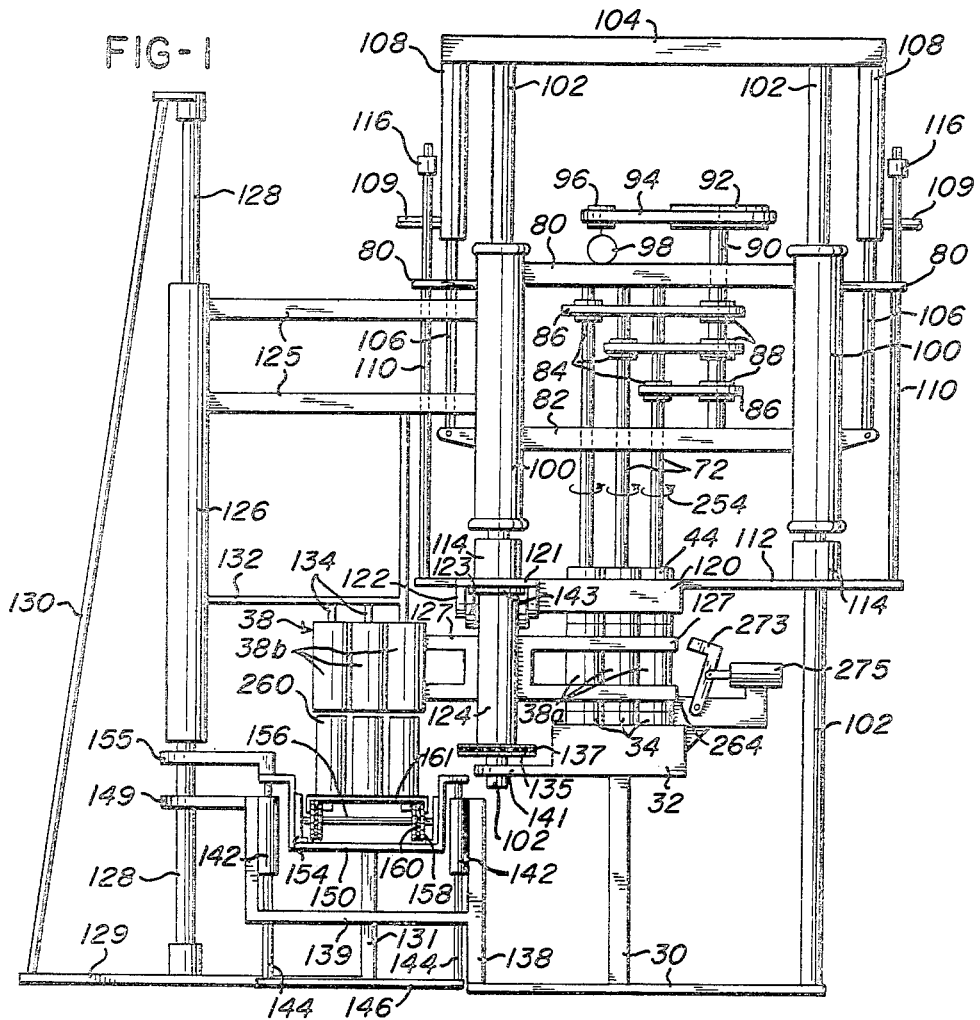
FIGURE 1 is an elevational view, somewhat diagrammatic, of a portion of the apparatus of this invention.

FIGURE 7 is an elevational view, similar to FIGURES 1, 3, and 5, but showing elements of the apparatus in another position of operation.

Figure 2:
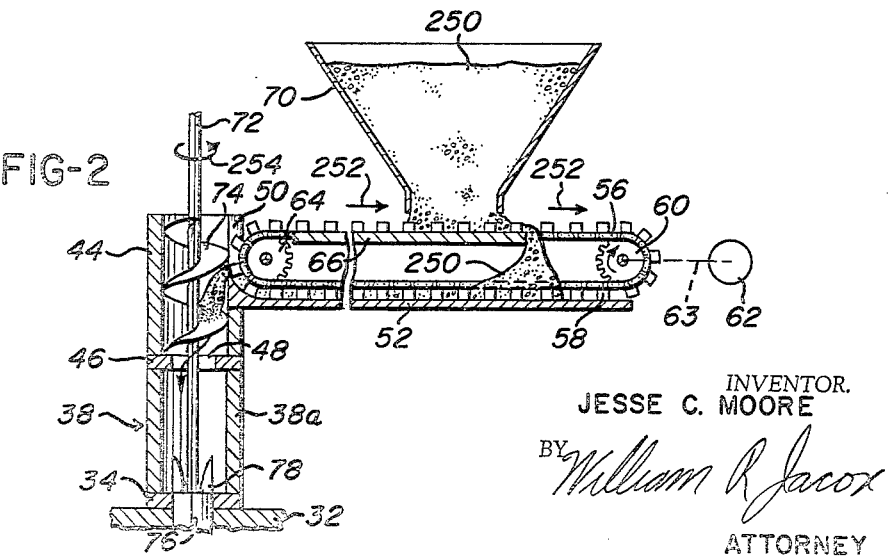
FIGURE 2 is a fragmentary sectional view, drawn on a larger scale than FIGURE 1, showing material transfer means and cylinder forming means of this invention.

FIGURE 8 is a sectional view, similar to FIGURES 2, 4, and 6, but showing elements of the apparatus in another position of operation.

FIGURE 9 is an elevational view, similar to FIGURES 1, 3, 5, and 7, but showing elements of the apparatus in another position of operation.

FIGURE 10 is a sectional view of a portion of the apparatus of FIGURES 2, 4, 6, and 8 and showing elements thereof in another position of operation.

FIGURE 11 is a sectional view taken substantially on line 11—11 of FIGURE 8.

FIGURE 12 is an elevational view, similar to FIGURES 1, 3, 5, 7, and 9, but showing elements of the apparatus in another position of operation.

FIGURE 13 is a sectional view, similar to FIGURES 2, 3, 6, and 8, but showing elements of the apparatus in another position of operation.

FIGURE 14 is a side elevational view, with parts shown in seciton, drawn on substantially the same scale as FIGURES 1, 3, 5, 7, 9, and 12 showing carrier transfer means of this invention.

FIGURE 15 a side elevational view, with parts shown in section, of a portion of the apparatus of FIGURE 14 but showing elements thereof in another position of operation.

FIGURE 16 is a side elevational view, similar to FIGURE 15, but showing elements thereof in another position of operation.

FIGURE 17 is a side elevational view, similar to FIGURES 15 and 16 but showing elements thereof in another position of operation.

FIGURE 18 is a side elevational view, similar to FIGURES 15, 16, and 17, but showing elements of the apparatus in another position of operation.

FIGURE 19 is a side elevational view, similar to FIGURES 15, 16, 17, and 18, but showing elements of the apparatus in another position of operation.

FIGURE 20 is a side elevational view of a portion of the apparatus of FIGURE 14 but showing elements of the apparatus in another position of operation.

FIGURE 21 is a side elevational view similar to FIGURE 14 and including a portion of the apparatus thereof, but showing elements of the apparatus in another position of operation.

FIGURE 22 is a greatly enlarged fragmentary sectional view showing a portion of the carrier dispenser mechanism of this invention, as shown in FIGURE 14.

FIGURE 23 is a fragmentary sectional view, similar to FIGURE 22, but showing the elements thereof in another position of operation.

FIGURE 24 is a fragmentary sectionl view, similar to FIGURES 22 and 23, but showing the elements thereof in another position of operation.

FIGURE 25 is a perspective view, drawn on substantially the same scale as FIGURE 14, shown lift mechanism of this invention.

FIGURE 26 is a perspective view, drawn on a slightly larger scale than FIGURE 25, of carrier dispenser mechanism of this invention.

FIGURE 27 is a perspective view, drawn on substantially the same scale as FIGURE 25, and showing the combination of the lift mechanism and the carrier dispenser mechanism of this invention.

FIGURE 28 is a fragmentary perspective view of a portion of the apparatus shown in FIGURE 27 and drawn on substantially the same scale as FIGURE 27.

Referring to the drawings in detail, the apparatus of this invention comprises support frame structure 30 which carries a base 32 which supports a bottom wall 34. A recess 36 is provided in the bottom wall 34 and in the base 32, as shown in FIGURES 4, 6, 8, and 10. Movably supported upon the bottom wall 34 are a plurality of mold cavity members 38. Herein three mold cavity members 38a are shown in FIGURES 1, 3, and 5, in engagement with the bottom wall 34 and coaxial with the recess 36.

Movably disposed above the mold cavity members 38 are a plurality of filler tubes 44, there being one filler tube 44 for each of the mold cavity members 38. Each filler tube 44 has a bottom wall 46 which is provided with a hole 48 therethrough, as shown in FIGURE 2. Each filler tube 44 has a longitudinally extending opening 50 in the side thereof. Partially disposed within the opening 50 is a feeder floor 52.

An endless conveyor chain 56 having a plurality of transverse spaced-apart cross members 58 is disposed above the feeder floor 52. A drive sprocket wheel 60 engages the conveyor chain 56 and is rotated by any suitable drive motor 62 which is operably joined thereto through a shaft 63 or the like. An idler sprocket wheel 64 is also known in engagement with the conveyor chain 56. The upper part of the chain 56 slidably moves over a shelf 66 which is disposed a slight distance below a hopper 70.

Extending into each of the filler tubes 44 is a shaft 72 having several convolutions of a screw blade 74 carried thereby. At the lower end of each shaft 72 is a plunger or packer 76 provided with ears 78 at the upper portion thereof. The shafts 72 are rotatably carried by a brace 80 and a brace 82. Each shaft 72 has a drive wheel 84 attached thereto. A belt 86 or the like encompasses the drive wheel 84 in driving relationship therewith. Each belt 86 also encompasses a drive wheel 88 which is attached to a drive shaft 90, which is rotatably carried by the braces 80 and 82. The drive shaft 90 has a drive wheel 92 attached thereto for rotation thereof. A belt 94 or the like encompasses the drive wheel 92 and also encompasses a wheel 96 which is driven by any suitable motor 98.

The braces 80 and 82 are attached to tubular guide members 100, each of which slidably encompasses a guide rod 102. At least one of the guide rods 102 is carried by the support structure 30. At the upper end of the guide rods 102 and attached thereto is a cross member 104. The brace 82 is attached to a plurality of axially movable actuator rods 106. Each actuator rod 106 is a part of a fluid motor 108 and is operable thereby. A fluid conductor member 109 is connected to each fluid motor 108 for energization thereof for axial movement of the actuator rod 106 thereof.

The ends of the brace 80 slidably encompass hoist rods 110 which are carried by a cross member 112 and extend upwardly therefrom. The cross member 112 is attached to sleeves 114, each of which slidably encompasses one of the guide rods 102. A nut 116 is attached to each hoist rod 110 at the upper end thereof so that when the nuts 116 rest upon the brace 80 the rods 110 are supported thereby.

A bracket 120 is secured to the cross member 112. The bracket 120 is attached to the filler tubes 44 for support thereof. The bracket 120 is also attached to a connector bracket 121 which has a plurality of downwardly extending connectors 112, each of which rotatably supports a lift wheel 123. The connector bracket 121 is attached to the cross member 112. The lift wheels 123 are positioned on opposite portions of a carriage post 124. The carriage post 124 has attached thereto a pair of bracket arms 127 extending in opposite directions therefrom. Each of the bracket arms 127 supports a plurality of the mold cavity members 38. Herein the mold cavity members 38a are shown attached to one of the bracket arms 127 and a group of mold cavity members 38b are carried by the other bracket arm 127.

A sprocket wheel 135 is attached to the carriage post 124 for rotation thereof. A chain 137 engages the sprocket wheel 135 for driving relationship thereto. A torque motor 119 or the like, shown in FIGURE 28, connected to the chain 137, continuously urges movement thereof for rotation of the carriage post 124. The carriage post 124 is rotatable about the guide rod 102 upon which it is supported. The lower end of the guide rod 102 which supports the carriage post 124 is secured to a bracket 141 which is carried by the base 32.

The carriage post 124 also has an encompassing ring 143 secured thereto which is enagageable by the lift wheels 123 for lifting of the carriage post 124.

Attached to one of the tubular guide members 100 are a plurality of support members 125 to which is secured a carrier sleeve 126. The carrier sleeve 126 encompasses a vertically disposed guide rod 128. The lower end of the guide rod 128 is attached to a bottom cross member 129. A brace 130 joins the upper portion of the guide rod 128 to the bottom cross member 129.

The bottom cross member 129 also has attached thereto a vertically extending post 131. The post 131 has a rack 133 attached thereto at the upper end thereof. Attached to one of the support members 125 and to the carrier sleeve 126 by means of connectors 132 are a plurality of rigid stems 134, each of which has secured thereto an ejector 136.

The support frame structure 30 also has a pair of spaced-apart posts 138 attached thereto. Each post 138 has attached thereto an L-shaped bracket 139, as shown in FIGURE 27. A tubular guide member 142 is also attached to each post 138 and a tubular guide member 142 is attached to each bracket 139. A vertically disposed lift rod 144 is slidably axially movable within each of the tubular guide members 142. The lower end of each lift rod 144 is attached to a rigid strip 146. As best shown in FIGURE 27, an elongate bedplate 148 extends between two guide member 142 and is attached thereto. Thus, the bedplates 148, the guide members 142, the brackets 139, and the post 138 are all integrally attached together to provide a bed which is attached to the support structure 30, as shown in FIGURES 25 and 27. Attached to one of the bedplates 148 is a lug 149 which slidably encompasses the rod 128 for guiding axial movement thereof.

At the upper end of each rod 144 is attached a cross-bracket 150, there being a cross-bracket 150 attached to a pair of the rods 144 at each end of the bedplates 148, as shown in FIGURE 25. Resting upon the cross-brackets 150 are a pair of L-shaped channel members 154, as shown in FIGURE 27. Attached to one of the channels 154 is an extension lug 155 which extends therefrom and which is secured to the guide rod 123.

At each end of the elongate channel members 154 is a rotary shaft 156 which is journalled in the channels 154. Adjacent each of the channels 154 and attached to the shafts 156 is a sprocket wheel 158. Along each of the channels 154 is an endless conveyor chain 160 which is carried by the sprocket wheels 158.

The conveyor chain 160 is adapted to carry one or more carrier members or pallets 161. Each pallet 161 has feet 163 adjacent the ends thereof.

As shown at the right hand portion of FIGURE 27, the shaft 156 extends through one of the channels 154 and has attached thereto a drive wheel 162. The drive wheel 162 is connected to a conveyor drive motor 164 by means of a drive chain 166 which has a drive wheel 168. The conveyor drive motor 164 is attached to the adjacent channel 154 for support thereby.

Attached to the bedplates 148 and extending therebelow are brackets 170, shown in FIGURE 27, which are adjacent the lift rods 144. As best shown in FIGURE 25, a shaft 172 is rotatably carried by the brackets 170 adjacent one pair of rods 144 and a shaft 172 is rotatably carried by the brackets 170 adjacent the opposite pair of lift rods 144. Intermediate the shafts 172 and substantially parallel therewith is an intermediate shaft 174.

Each of the shafts 172 has attached thereto for rotation about the axis thereof an inner pair of sprocket wheels 176 and an outer pair of sprocket wheels 178. The shaft 174 has attached thereto for rotation therewith an inner pair of sprocket wheels 180 and an outer pair of sprocket wheels 182. A lift chain 184 partially encompasses each of the sprocket wheels 180 and 182. A part of each lift chain 184 extends over an outer sprocket wheel 178 of one of the shafts 172 and it attached to the rigid strip 146 adjacent the lower end of a pair of the lift rods 144, as shown in FIGURES 25 and 27. A part of each lift chain 184 extends under an inner sprocket wheel 176 of one of the shafts 172 and is attached to a cross-bracket 150 adjacent the upper end of the lift rods 144. As stated above, each pair of the lift rods 144 is attached at the lower ends thereof to a rigid strip 146 and the upper end of each lift rod 144 is attached to a cross-bracket 150. Thus, each pair of the lift rods 144, the cross-bracket 150, and the rigid strip 146 form a lift frame 187 at spaced apart portions of the support structure 30, as shown in FIGURES 25 and 27. Thus, one end of each lift chain 184 is attached to the lower part of the lift frame 187 and one end of each lift chain 184 is attached to the upper part of the lift frame 187.

One pair of lift chains 184 has a connector bar 186 attached thereto and extending therebetween. A fluid motor 188 is attached to the bedplates 148 by brackets 189 shown in FIGURES 14 and 20. The fluid motor 188 has an actuator rod 190 attached to the connector bar 186.

As best shown in FIGURE 27, at the left hand portion thereof, a carrier dispenser or pallet dispenser 194 is carried by the channels 154. The pallet dispenser 194 comprises a plurality of legs 196 which are attached to the channels 154 and extend thereabove. A cross-member 198 disposed below the channels 154, joins a pair of the legs 196 together at each end of the pallet dispenser 194. Two of the legs 196 rise higher than the other legs 196 and have attached thereto at the upper ends thereof a support bar 200. A fluid motor 202 is attached to the support bar 200 for support thereby. The fluid motor 202 has an actuator rod 203. A support bar 206 joins two of the legs 196 and a support bar 208 joins the other pair of the legs 196.

Attached to the support bar 206 are support bearings 210 which rotatably support a shaft 212, as shown in FIGURE 26. Attached to the shaft 212 and extending downwardly therefrom are arms 214. The lower end of each arm 214 has a finger 216 which is substantially normal thereto, as shown in FIGURES 26 and 27. Attached to the arms 214 is a transverse link 218. The link 218 extends beyond the arms 214 and has connected thereto at each end thereof a link 220. The links 220 are outside the confines of the legs 196 and extend to positions beyond the opposite pair of legs 196. The links 220 have a link 222 attached thereto at the ends thereof opposite the arms 214. The link 222 has a plurality of fingers 224 attached thereto, as shown in FIGURE 26. The links 218, 220, and 222 form a frame which encompasses the legs 196.

The support bar 208 has attached thereto support bearings 226 which rotatably carry a shaft 228, as shown in FIGURE 27. A plurality of arms 230 are secured to the shaft 228 and extend downwardly therefrom. Each of the arms 230 has a finger 231 attached thereto at the lower end thereof, as shown in FIGURE 26. The arms 230 have a link 232 secured thereto. A link 234 is secured to the link 232 at each end thereof. A link 236 is attached to the ends of the links 234 so that the links 232, 234, and 236 form a frame which encompasses the legs 196. A plurality of fingers 238 are attached to the link 236.

A lever 242 is attached to the shaft 212 for rotative movement thereof. The lever 242 is also pivotally attached to the actuator rod 203 of the fluid motor 202 for actuation thereby. A lever 244 is attached to the shaft 228 for rotation thereof. The lever 244 is also pivotally attached to the actuator rod 203 of the fluid motor 202 for actuation thereby.

OPERATION

The apparatus of this invention is employed for forming mold material into any of various sizes and shapes. However, the invention is primarily related to the formation of tubular members. The tubular members produced may have any desired exterior shape. Herein the apparatus of the invention is shown as being used for the production of hollow cylindrical members.

Suitable material 250 for producing hollow cylindrical conduit members is supplied to the hopper 70, as shown in FIGURES 2, 4, 6, 8, and 13. The material 250 may comprise concrete or the like or any other suitable material in a semi-fluid state and which solidifies under certain conditions of time or temperature or pressure. FIGURES 1 and 2 show the position of the members of the apparatus at the beginning of a cycle of producing a conduit member. Each plunger or packet 76 is positioned within the recess 36 as the packer 76 is in its lowermost position. The motor 62 is operating and rotates the drive sprocket wheel 60. Thus, the endless conveyor chain 56 and the cross members 58 are moving in the direction illustrated by arrows 252 in FIGURE 2. Thus, the cross members 58 move the material 250 from the bottom of the hopper 70 and along the shelf 66. The material 250 falls from the shelf 66 and between the cross members 58. The material 250 falls upon the feeder floor 52 and is moved by the cross members 58 of the chains 56 toward the filler tubes 44. The material 250 falls from the feeder floor 52 into the filler tubes 44.

While the material 250 is being introduced into the mold cavity members 38a, the shafts 72 are being rotated by the motor 98. The shafts 72 are rotated in the direction illustrated by arrows 254 in FIGURES 1 and 2. The rotating screw blade 74 carried by each shaft 72 urges the material 250 from its respective filler tube 44 into the mold cavity member 38 which is directly therebelow. Thus, the screw blades 74 force the material 250 into the mold cavity members 38. After the material 250 begins to fall into the mold cavity members 38, the fluid motors 108 are energized by fluid flowing thereinto through the fluid conductors 109. Therefore, the actuator rods 106 are moved slowly upwardly. Thus, the braces 80 and 82 are lifted slowly. Thus, the shafts 72 are lifted slowly, moving the packers 76 from the bottom of the mold cavity members 38a to the top thereof, as illustrated in FIGURE 4. Therefore, the material 250 within the mold cavity members 38 is forced toward the sides of the mold cavity members 38 by the plungers 76 and by the ears 78 thereof. Thus, the material 250 within each mold cavity member 38a is formed into a hollow cylindrical conduit member 260, as shown in FIGURE 4.

The motor 62 is operated during a period of time which is necessary to transfer sufficient material 250 from the hopper 70 to the filler tubes 44 for the formation of a cylindrical member 260 within each mold cavity member 38. However, in order to assure that a sufficient amount of material 250 is available to form a cylindrical member 260 within each mold cavity member 38, an excess of the material 250 is fed into the filler tubes 44, as illustrated in FIGURE 4. Thus, after a tubular member 260 is formed within each mold cavity member 38 a quantity of material 250 remains within each of the filler tubes 44. This excess material 250 appears in the form of a tubular body of material 250, encompassing the packer 76 within each filler tube 44, as shown in FIGURE 4. The amount of the excess material 250 remaining in the filler tubes 44 after formation of tubular members 260 within the mold cavity members 38 varies. The amount of excess material 250 remaining in the filler tubes 44 varies with certain conditions in the material 250 and with other conditions of operation of the apparatus. When the material 250 within the filler tubes 44 reaches a certain height, movement of the cross members 58 in a direction toward the hopper 70 carries therewith a portion of the excess material 250.

Thus, the material feed apparatus shown in FIGURES 2, 4, 6, 8, and 13 always transfers sufficient material 250 to the filler tubes 44 to form cylindrical members 260 within the mold cavity members 38. At the same time if the material 250 in the feeder tubes 44 is in excess of a given amount, the feed material apparatus automatically removes a portion of the excess material. Thus, there is no accumulation of excess material 250 within the filler tubes 44 as one cycle of molding operation follows a previous cycle of molding operation.

After the motor 62 ceases to feed material 250 to the filler tubes 44, the shafts 72 continue to rotate. Thus, if the amount of material 250 within each filler tube 44 extends substantially above the packer members 76, the ears 78 at the upper portion of each packer 76 throw material 250 from the upper portion of the filler tube 44 toward the shelf 66, as shown in FIGURE 4. The material 250 thrown by the ears 78 rests between the cross members 58 which are adjacent the shelf 66. Thus, when the motor 62 is again operated, the excess material 250 disposed between the cross members 58 is carried away from the filler tubes 44 toward the hopper 70.

The fluid motors 108 continue to slowly move the actuator rods 106 upwardly. Thus, the brace 80 continues to move upwardly, as shown in FIGURE 3. As shown and discussed above, the brace 80 encompasses each of the rods 110. When the brace 80 reaches the nuts 116 of the rods 110, the rods 110 are lifted. The bracket 120 is carried by the rods 110 through the cross member 112. Thus, the bracket 120 is lifted as the rods 110 move upwardly. Therefore, the filler tubes 44, which are attached to the bracket 120, are lifted upwardly, as shown in FIGURE 5, out of engagement with the mold cavity members 38.

The fluid motors 108 continue to move the actuator rods 106 and the rods 110 upwardly. Due to the fact that the connector bracket 121 is attached to one of the rods 110, the bracket 121 is also lifted. Thus, the wheels 123, carried thereby, are lifted. The wheels 123 thus engage the ring 143 which is attached to the carriage post 124. Thus, the carriage post 124 is lifted, causing the bracket arms 127 to be lifted. Thus, the mold cavity members 38 are lifted. One of the bracket arms 127, as shown in FIGURES 1, 3, and 5, is in abutting engagement with an abutment member 264. The rotative position of the carriage post 124 and the bracket arms 127 and the mold cavity members 38 is thus maintained. However, when the arms 127 are lifted, as shown in FIGURE 7, the bracket arm 127 moves from engagement with the abutment member 264.

As stated above, a motor 119 or the like, shown in FIGURE 28, connected to the chain 137 continuously urges rotation of the carriage post 124. Thus, when the arms 127 are moved upwardly, by upward movement of the carriage post 124, as shown in FIGURE 7, removing the abutment member 264 from engagement by the arms 127, the torque motor 119 causes rotative movement of the carriage post 124, as illustrated in FIGURE 9. Thus, the mold cavity members 38a with the molded cylindrical members 260 therewithin are moved from the position thereof adjacent the filler tubes 44 toward the table formed by the channel members 154.

FIGURES 1, 3, 5, 7, 9, and 14 show a plurality of the cylindrical members 260 which have been made in the manner discussed above and which have been deposited upon a pallet 161 which is carried by the conveyor chains 160.

FIGURE 14 shows seven rows of cylindrical members 260 which have been deposited upon a pallet 161 during seven successive operations of the apparatus.

FIGURE 14 also shows the position of the mold cavity members 38b and other elements of the apparatus when the apparatus is operating in the manner illustrated and discussed with respect to FIGURES 1 and 2.

FIGURE 15 illustrates the position of the elements shown during operation of the apparatus as illustrated in FIGURE 3. FIGURE 16 illustrates the position of the elements shown during operation of the apparatus as illustrated in FIGURE 5.

FIGURE 17 illustrates in solid lines the position of the elements shown during operation of the apparatus in the manner illustrated in FIGURE 7.

FIGURE 9 and the broken lines of FIGURE 17 illustrate rotative movement of the carriage post 124 with the bracket arms 127 carried thereby. During rotative movement of the carriage post 124, as illustrated in FIGURES 9 and 17, the motor 164 is operated so that the conveyor chains 160 are operated. Thus, the chains 160 move the pallet 161 to the right, as illustrated by an arrow 270 in FIGURES 18 and 19 during rotative movement of the carriage post 124. Also, during rotative movement of the carriage post 124, the fluid motor 188 is operated so that the actuator rod 190 is forced toward the right, as shown in FIGURE 20. Thus, the lower portion of the chains 184 to which the connector bar 186 is attached is moved toward the right. Such movement of the chains 184 causes rotative movement of the sprocket wheels 178 and 182 and the shafts 172 and 174 attached thereto. Therefore, the chains 184 lift upon the rigid strips 146 and the lift frames 187 thereof. Thus, the channel members 154 are lifted as illustrated by an arrow 272 in FIGURES 9 and 20. Thus, the post 131, the cross member 129 and the guide rod 128 are lifted, as shown in FIGURE 9, as movement of the guide rod 128 is guided by the lug 149.

Even though the lift frames 187 are at greatly spaced-apart positions, the chains 184 operate to lift the lift frames 187 precisely simultaneously. Thus, the channels 154 remain horizontal as they are lifted. Therefore, the pallet 161 is lifted horizontally as the pallet 161 is moved forwardly. Thus, after the carriage post 124 has rotatively moved through 180 degrees, the mold cavity members 38a are positioned directly behind the seventh row of the cylindrical members 260 which have been deposited upon the pallet 161, as shown in FIGURE 20. A stop member 273 is operated by a motor 275 to a position as shown in FIGURE 9 so that the stop member 273 is engaged by one of the mold cavity members 38b. Thus, the carriage post 124 and the arms 127 are maintained in positions so that the mold cavity members 38a are directly behind the seventh row of the cylindrical members 260 which have been deposited upon the pallet 161.

As the channel members 154 and the pallet 161 reach their upper position of operation, the fluid motors 108 become de-energized or operate in the reverse manner so that the actuator rods 106 and the guide members 100 and the rods 110 move downwardly, as illustrated in FIGURE 12.

Due to the fact that the carriage post 124 and the carriage arms 127 are carried by the rods 110, the mold cavity members 38 are lowered. Thus, the mold cavity members 38a are lowered toward the pallet 161 as the pallet 161 is at its upper position of operation as shown in FIGURE 20.

Furthermore, due to the fact that the ejector members 136 are carried by the stems 134 which are supported by the support members 125, the ejector members 136 are lowered as the pallet 161 is at its upper position of operation, as shown in FIGURE 20. As the ejector members 136 move downwardly, they move into the mold cavity members 38a as the mold cavity members 38a are positioned slightly above the pallet 161 and directly behind the seventh row of the cylindrical members 260 which have been disposed upon the pallet 161. Thus, the ejector members 136 engage the cylindrical members 260 which are within the mold cavity members 38a and force the cylindrical members 260 therefrom. Due to the fact that the mold cavity members 38a have been moved downwardly and due to the fact that the pallet 161 has been moved upwardly the cylindrical members 260 pass directly from the mold cavity members 38a to the pallet 161. Thus, there is only slight travel of the cylindrical members 260 from the mold cavity members 38a to the pallet 161. Thus, there is no appreciable drop of the cylindrical members 260 from the mold cavity members 38a to the pallet 161. Thus, at this moment, as illustrated in FIGURE 20, the cylindrical members 260 are resting upon the pallet 161 but the cylindrical members 260 are substantially enclosed by the mold cavity members 38a.

At this time the fluid motor 188 is de-actuated. The carrier sleeve 126, moving downwardly, engages the extension lug 155, as shown in FIGURE 12. Thus, the carrier sleeve 126 and the weight or force of the apparatus attached thereto urges movement of the channel members 154 downwardly. Therefore, at this time, the channels 154 and the sleeve 126 move downwardly precisely together. Thus, the ejector members 136 and the pallet 161 are lowered precisely together. As this occurs, the ejector members 136 are forcing the cylindrical members 260 from the mold cavity members 38a to the pallet 161, as illustrated in FIGURE 20. Thus, the space between the ejector members 136 and the pallet 161 remains precisely constant during ejection of the cylindrical members 260 from the mold cavity members 38a. Thus, the pressure applied to the cylindrical members 260 by the ejector members 136 does not become excessive and there is no crushing force applied to the freshly formed cylindrical members 260. When the ejectors 136 reach the bottom of the mold cavity members 38, the cylindrical members 260 therein have been completely ejected therefrom to the pallet 161 and a new or eighth row of cylindrical members 260 becomes positioned upon the pallet 161.

As shown and discussed, the ejector members 136 and the packer members 76 are joined together through the members 132, 126, 125, and 80. Therefore, as the ejector members 136 move downwardly, the packer members 76 also move downwardly, as illustrated in FIGURE 13. As the lower portion of the packers 76 enter the openings 36, the screw blades 74 which are attached to the same shaft 72 as the packer 76 engage the excess material within the respective filler tubes 44. Due to the fact that the shafts 72 are rotating, as illustrated, the screw blades 74 force the excess material 250 from filler tubes 44 into the mold cavity members 38b, as shown in FIGURE 13. At this time, the motor 62 is again energized and material 250 is fed from the hopper 70, as illustrated in FIGURE 13.

When the ejectors 136 reach their lowermost position, the packer members 76 are at their lowermost position as shown in FIGURE 2. Thus, as the motor 62 again operates the conveyor chain 56 and moves the material 250 from the hopper 70 to the filler tubes 44, a new cycle of production of cylindrical members 260 is in operation and is carried out in the manner discussed above.

As shown in FIGURE 21, eight rows of cylindrical members 260 completely fill the pallet 161. Means, not shown, are provided for automatically operating the motor 164 for operation of the chains 160 for movement of the loaded pallet 161 from the channels 154 to any suitable receiver means, shown in FIGURE 21 as being a conveyor member 280.

As shown in FIGURES 14 and 21, the pallet dispenser 194 carries a plurality of pallets 161, as the pallets 161 are stacked one upon the other with the feet 163 of each pallet 161 resting upon the surface of each pallet 161 directly therebelow. The lowermost pallet 161 in the stack thereof, which is carried by the pallet dispenser 194, is normally supported by the fingers 216 of the arms 214 and by the fingers 231 of the arms 230, as shown in FIGURES 14 and 22. The lowermost pallet 161 rests directly upon the fingers 216 and 231 while the fingers 216 and 231 are positioned between the feet 163 of the pallet 161. The fingers 238 and 224 of the links 236 and 222, respectively, are normally spaced slightly from the pallets 161, as shown in FIGURES 14 and 22.

As the loaded pallet 161 moves from the channels 154 to the conveyor 280, a succeeding pallet 161 is dispensed from the carrier dispenser or pallet dispenser 194. The fluid motor 202 is energized so that the actuator rod 203 is moved downwardly. Thus, the levers 242 and 244, which are attached to the actuator rod 203, are rotatively moved downwardly and thus rotatively move the shafts 212 and 228, as illustrated in FIGURE 21. Thus, the arms 214 and 230 and the fingers 216 and 231, respectively, thereof, are moved outwardly from the positions thereof shown in FIGURE 14 to the positions thereof shown in FIGURES 21 and 23. When such outward movement of the fingers 216 and 231 occurs, the fingers 216 and 231 are removed from engagement with the lowermost pallet 161, and the lowermost pallet 161 thus falls from the pallet dispenser 194 to the conveyor chains 160, as shown in FIGURES 21 and 23.

Due to the fact that the link 222 is attached to the arms 214 through the links 220 and 218, the link 222 moves toward the legs 196 as the arms 214 move away from the legs 196. Thus, the fingers 224 which are carried by the link 222 are moved toward the legs 196. Likewise, due to the fact that the link 236 is attached to the arms 230 through the links 234 and 232, the link 236 moves toward the legs 196 as the arms 230 move away from the legs 196. Thus, the fingers 238 which are attached to the link 236 move toward the legs 196.

When the fingers 224 and 238 and the links 222 and 236 move toward the pallets 161, the fingers 224 and 238 become positioned under the pallet 161 which is directly above the lowermost pallet 161 immediately before the fingers 216 and 231 are withdrawn from supporting engagement with the lowermost pallet 161. Thus, when the lowermost pallet 161 falls to the conveyor chains 160, the pallet 161 which is supported by the fingers 224 and 238 becomes the lowermost pallet 161, as shown in FIGURES 21 and 23.

Then the fluid motor 202 is again operated to move the actuator rod 203 upwardly. Thus, the arms 214 and 230 are moved toward the pallets 161 so that the fingers 216 and 231, respectively, thereof become positioned below the lowermost pallet 161, as shown in FIGURE 24. As the fingers 216 and 231 become positioned below the lowermost pallet 161, the fingers 224 and 238 are withdrawn therefrom. Thus, the lowermost pallet 161 drops from the fingers 224 and 238 to the fingers 216 and 231, as illustrated in FIGURE 24. Of course, when the lowermost pallet 161 drops within the pallet dispenser 194, all the pallets 161 in the stack thereof above the lowermost pallet 161 and which are supported thereby drop within the pallet dispenser 194. Of course, additional pallets 161 may be added to the stack at the top thereof in any suitable manner and as desired.

As the pallet 161 which is loaded with cylindrical members 260 moves from the conveyor chains 160, as illustrated in FIGURE 21, the pallet 161 which has just been dispensed from the pallet dispenser 194 moves to a position adjacent the ejector members 136 for receipt of formed members 260.

Due to the fact that the carrier dispenser member or pallet member 194 is supported by the channel members 154, the carrier dispenser member 194 is raised and lowered with the channel members 154. Thus, the lowermost pallet member 161 always drops the same distance from the pallet dispenser apparatus 194 to the conveyor chains 160 regardless of the elevation of the conveyor chain members 160. Thus, the pallet dispenser apparatus can be operated at any desired moment regardless of the positions of operation of the elements of the conveyor apparatus or cylinder forming apparatus.

It is to be understood that any suitable control mechanism may be employed for controlling operation of the apparatus of this invention in the manner discussed above.

The invention having thus been described, the following is claimed:

1. Apparatus for high speed seriatim production of bodies of molded material comprising:
rotatable support structure,
a plurality of mold cavity members carried by the rotatable support structure and spaced from the axis of rotation of the support structure, each mold cavity member being adapted to support mold material during formation thereof into a body of molded material,
there being a first station position and a second station position for the mold cavity members,
the support structure being rotatably movable to position a mold cavity member at either of said station positions, there being a mold cavity member at the first station position when there is a mold cavity member at the second station position and vice versa, means at the first station position for discharging mold material into a mold cavity member,
packer means at the first station position for molding material within a mold cavity member into a body of molded material,
ejector means at the second station position for urging a body of molded material from a mold cavity member,
the packer means and the ejector means being openable during movement thereof,
the packer means at the first station position and the ejector means at the second station position being joined in fixed spaced relationship one to the other for movement one with the other.

2. The apparatus of claim 1 which includes movable receiver means disposed at the second station position to receive a body of molded material ejected from the mold cavity member by the ejector means, the receiver means being movable upwardly and downwardly,
motor means for moving the receiver means upwardly,
support means attached to the packer means and to the ejector means for movement thereof,
means connecting the support means to the receiver means for downward movement of the receiver means with movement of the support means during a portion of the downward movement of the receiver means and the support means.

3. Apparatus for high speed seriatim production of bodies of molded material comprising:
rotatable support structure, the rotatable support structure having a plurality of radial arms,
a plurality of mold cavity members, there being a mold cavity member carried by each of the radial arms and adapted to carry mold material therein,
means at a first position for discharging mold material into a mold cavity member,
packer means at the first position for molding material within a mold cavity member into a body of molded material,
ejector means at a second position for urging a body of molded material from a mold cavity member, there being a mold cavity member at the first position when there is an old cavity member at the second position and vice versa,
the support structure being rotatable to move each arm to the first position for reception of mold material by a mold cavity member disposed at the first position, the support structure being rotatable to move each arm to a second position for discharge of a body of molded material from within a mold cavity member disposed at the second position as the ejector means urges movement of the body of molded material from a cavity member,
receiver means at the second position for receiving a body of molded material from a mold cavity member, the receiver means being movable upwardly and downwardly,
the packer means and the ejector means and the receiver means being movable upwardly and downwardly during operation thereof, means operably joining the packer means and the ejector means one to the other for simultaneous movement upwardly and downwardly, means operably joining the receiver means to the packer means and to the ejector means for downward movement of the receiver means during a portion of the downward movement of the ejector means and the packer means.

4. Apparatus for high speed seriatim production of bodies of molded material comprising:
first movable support structure,
rotatable support structure carried by the first movable support structure, the rotatable support structure having a plurality of radially extending arms.
a plurality of mold cavity members, there being at least one mold cavity member carried by each of the radially extending arms, each mold cavity member being adapted to support mold material,
the rotatable support structure being rotatable to position each arm at a first position, the rotatable support structure being rotatable to position each arm at a second position, there being an arm at the second position when there is an arm at the first position and vice versa,
mold material fill means at the first position for providing mold material to a mold cavity member disposed at the first position,
second movable support structure,
forming means carried by the second movable support structure at the first position for forming material into a body of molded material as the mold cavity member is disposed at the first position,
third movable support structure,
receiver means at the second position for receipt of a body of molded material from a mold cavity member disposed at the second position, the receiver means being carried by the third movable support structure,
ejector means at the second position for ejecting a body of molded material from a mold cavity member disposed at the second position as the body of molded material is engaged by the ejector means and moved from the mold cavity member to the receiver means, the ejector means being carried by the second movable support structure,
means joining the first movable support structure to the second movable support structure for movement one with the other throughout a portion of the travel of the second movable support structure,
the third movable support structure and the second movable support structure being relatively movable throughout a portion of the travel thereof,
means joining the second movable support structure to the third movable support structure for movement one with the other throughout a portion of the travel of the second movable support structure, the ejector means thus being movable with movement of the forming means, the receiver means thus being movable to a position adjacent a mold cavity member at the second position, the receiver means thus being movable with movement of the ejector means as the ejector means ejects a body of molded material from a mold cavity member.

References Cited

UNITED STATES PATENTS

| | | |
|---|---|---|
| 518,625 | 4/1894 | Pecht. |
| 805,299 | 11/1905 | Kastenhuber _____ 25—69 |
| 1,599,151 | 9/1926 | Vought _____ 25—69 |
| 2,080,783 | 5/1937 | Petersen. |
| 2,121,635 | 6/1938 | Knapp et al. |
| 2,329,346 | 9/1943 | Goff. |
| 2,375,955 | 5/1945 | Smith. |
| 2,916,793 | 12/1959 | Ellis et al. _____ 25—41.4 |
| 2,957,222 | 10/1960 | Zmania et al. _____ 25—41.4 |
| 3,050,808 | 8/1962 | Clanton et al. _____ 25—41.4 |
| 3,128,522 | 4/1964 | Benjey et al. _____ 25—41.4 |
| 3,129,482 | 4/1964 | Wellnitz. |

WILLIAMSON J. STEPHENSON, Primary Examiner

U.S. Cl. X.R.

25—41, 69